United States Patent
Schick et al.

(10) Patent No.: US 12,299,223 B2
(45) Date of Patent: May 13, 2025

(54) GRAPHICAL USER INTERFACE FOR USE WITH TAP DEVICE

(71) Applicant: Tap Systems Inc., Pasadena, CA (US)

(72) Inventors: David B. Schick, Los Angeles, CA (US); Liron Ilouz, Aley Zahav (IL); Guy Dori Bliss, Modi'in-Maccabim-Re'ut (IL)

(73) Assignee: Tap Systems Inc., Pasadena, CA (US)

( * ) Notice: Subject to any disclaimer, the term of this patent is extended or adjusted under 35 U.S.C. 154(b) by 0 days.

(21) Appl. No.: 18/170,118

(22) Filed: Feb. 16, 2023

(65) Prior Publication Data
US 2023/0266837 A1 Aug. 24, 2023

Related U.S. Application Data

(60) Provisional application No. 63/312,428, filed on Feb. 22, 2022.

(51) Int. Cl.
*G06F 3/041* (2006.01)
*G06F 3/04817* (2022.01)
*G06F 3/0485* (2022.01)

(52) U.S. Cl.
CPC ........ *G06F 3/0412* (2013.01); *G06F 3/04817* (2013.01); *G06F 3/0485* (2013.01); *G06F 2203/04104* (2013.01)

(58) Field of Classification Search
CPC .. G06F 3/0412; G06F 3/04817; G06F 3/0485; G06F 2203/04104
See application file for complete search history.

(56) References Cited

U.S. PATENT DOCUMENTS

| | | | | |
|---|---|---|---|---|
| 8,593,421 B2 * | 11/2013 | Krishnaswamy | ... | G06F 3/04886 715/810 |
| 8,760,424 B2 * | 6/2014 | Laubach | ...... | G06F 3/0235 345/173 |
| 8,933,888 B2 * | 1/2015 | Laubach | ...... | G06F 3/04886 345/168 |
| 9,104,308 B2 * | 8/2015 | Au | ...... | G06F 3/04883 |
| 9,195,321 B2 * | 11/2015 | Laubach | ...... | G06F 3/04845 |
| 9,794,506 B2 * | 10/2017 | Cho | ...... | G06F 3/0383 |
| 10,019,151 B2 * | 7/2018 | Hu | ...... | G06F 3/0488 |
| 10,599,216 B2 * | 3/2020 | Schick | ...... | G06F 3/017 |
| 10,691,205 B1 * | 6/2020 | Schick | ...... | G06F 3/014 |
| 11,009,950 B2 * | 5/2021 | Schick | ...... | H04N 23/00 |
| 2012/0154313 A1 * | 6/2012 | Au | ...... | G06F 3/04883 345/173 |

(Continued)

*Primary Examiner* — Michael J Jansen, II
(74) *Attorney, Agent, or Firm* — Venable LLP

(57) ABSTRACT

An information processing device includes a display, a communication interface configured to receive signals from a tap device, one or more processors, and one or memories storing instructions. Upon execution by the one or more processors, the instructions cause the one or more processors to: display a plurality of icons on the display in a predetermined pattern as a graphical user interface; in response to a selection signal received from the tap device, select one of the plurality of displayed icons; in response to an activation signal received from the tap device, activate a function corresponding to the selected icon; and in response to a shift signal received from the tap device, shift the plurality of icons to different positions in the predetermined pattern.

23 Claims, 16 Drawing Sheets

(56) References Cited

U.S. PATENT DOCUMENTS

| | | | | |
|---|---|---|---|---|
| 2012/0235912 A1* | 9/2012 | Laubach | ............... | G06F 3/0485 |
| | | | | 345/163 |
| 2012/0235938 A1* | 9/2012 | Laubach | ............ | G06F 3/04883 |
| | | | | 345/173 |
| 2012/0242581 A1* | 9/2012 | Laubach | ............ | G06F 3/04812 |
| | | | | 345/173 |
| 2012/0242586 A1* | 9/2012 | Krishnaswamy | ..... | G06F 3/0482 |
| | | | | 345/173 |
| 2015/0370442 A1* | 12/2015 | Hu | ..................... | G06F 3/04883 |
| | | | | 345/173 |
| 2016/0259407 A1* | 9/2016 | Schick | .................. | G06F 3/0304 |
| 2016/0277699 A1* | 9/2016 | Cho | ..................... | G06F 3/0383 |
| 2019/0302963 A1* | 10/2019 | Harrison | ................ | G06V 40/28 |
| 2020/0174568 A1* | 6/2020 | Schick | .................. | H04N 23/00 |

\* cited by examiner

GRAPHICAL USER INTERFACE FOR USE WITH TAP DEVICE

CROSS-REFERENCE TO RELATED APPLICATION

This application claims priority to U.S. Provisional Patent Application No. 63/312,428 filed Feb. 22, 2022, the entirety of which is incorporated by reference herein.

BACKGROUND

Field

Example aspects described herein relate generally to a graphical user interface and, in particular, to a graphical user interface controlled by a tap device.

Description of Related Art

In a conventional operating system (OS), a graphical user interface (GUI) typically uses a point-and-click approach. For example, to initiate execution of an application, a user may move a cursor (using a mouse, keyboard arrows, or the like) to hover over, or point at, a selectable item (e.g., a menu option, a tab, an icon representing a folder or an application, etc.). The user then clicks (or double-clicks) on the item (using a mouse button, a keyboard enter key, or the like) to activate the item (e.g., to select the menu option or display a submenu of options, to open a folder or file, to initiate execution of a selected application, etc.). Furthermore, applications and/or device drivers may be created to interface with and utilize the GUI capability of the OS.

Such conventional interfaces may require use of all or a substantial portion of a display screen. For example, icons and/or menus representing various applications or possible options (e.g., opening a settings screen or menu, opening a particular folder or files) may be displayed across all of a screen or a substantial portion of a screen. This may pose a disadvantage when the GUI obscures or distracts from other content on the display screen.

Another disadvantage of the point-and-click approach is that accuracy in using the GUI may be impaired, particularly when a user is moving. Moving a cursor to a desired position over an icon or menu option requires the user to focus on the desired position and utilize significant hand and eye coordination. Furthermore, a user who is interacting with a GUI displayed on a mobile device such as a cell phone may be walking while using the device, and/or holding the device in one hand, which may make it even more difficult to accurately move the cursor to the desired location.

The above-noted disadvantages become even more pronounced for a GUI used in a VR (virtual reality) system or an AR (augmented reality) system. It is undesirable in a VR system to have the GUI obscure any of the computer-generated display content, and it is undesirable in an AR system to have the GUI obscure any of the computer-generated display content or any of the user's actual viewed content with which the computer-generated content is integrated. Furthermore, in a VR or AR system it is even more likely that the user is moving while interacting with the GUI, making it harder to use a point-and-click based GUI. In addition, hand or finger gestures may be used to interact with a user interface in a VR or AR system (although they may also be used for interacting with an interface in some conventional computer systems). As one example, a user may move an index finger around in the air to move a virtual cursor, and then execute a pinching motion with the index finger and thumb to activate an icon on which the virtual cursor is positioned. This type of gesture control of a GUI is difficult to perform accurately while a user is moving. Moreover, this type of gesture control of a GUI typically requires holding the hand raised in the air while gesturing, which may cause fatigue of the user's arm. In addition, the user may experience visual fatigue, because there is no tactile feedback and the user must rely on vision to move their hand (or a virtual cursor) to the proper position.

SUMMARY

One object of the present invention is to provide an improved GUI and an improved way of interacting with a GUI by using a tap device. In particular, one object of the present invention is to provide a GUI that can occupy a compact area of a display screen. Another object of the present invention is to provide a GUI that can be used more easily and more accurately by a user. In particular, an object of the present invention is to provide a GUI in which items can be selected and/or activated without the need to use a pointing device (i.e., the present invention eliminates the need for a clickable pointing device.) Yet another object of the present invention is to provide a GUI that can be used by a user with a relaxed arm, to reduce or eliminate arm fatigue. A further object of the present invention is to provide a GUI that can prevent or minimize visual fatigue.

These objects and others are achieved by providing a GUI having a unique format and which is controlled by a tap device. In one preferred embodiment, which uses a one-handed tap device, the GUI displays at most five items at any particular level, so there is always a one-to-one correspondence between the fingers of a hand and the displayed items. (While there may be a total of more than five items available at a given level, the items circulate through the five slots for items that are available for selection—in accordance with user commands given via the tap device—so that at any point in time the user can interact with only five items and the other items are not available for interaction.) Those skilled in the art will appreciate that other embodiments could use a two-handed tap device, but it is preferable to maintain a one-to-one correspondence between the number of displayed items available for interaction and the number of fingers for which a tap can be detected. Furthermore, the GUI uses a click-to-select approach, and in particular a tap-to-select approach, rather than a point-and-click approach. Therefore, precise movement of a cursor to a particular position on a display (such as, for example, a computer display screen, a phone display screen, or a display in a VR or AR system) is not required.

The features and advantages of the example embodiments presented herein will become more apparent from the detailed description set forth below when taken in conjunction with the drawings.

DETAILED DESCRIPTION

The example embodiments of the invention presented herein are directed to methods, systems and computer program products for a graphical user interface that can be controlled by a tap device. This description is not intended to limit the application of the example embodiments presented herein. In fact, after reading the following description it will be apparent to one skilled in the relevant art(s) how to implement all of the following example embodiments and many variations thereof.

Figure 1:
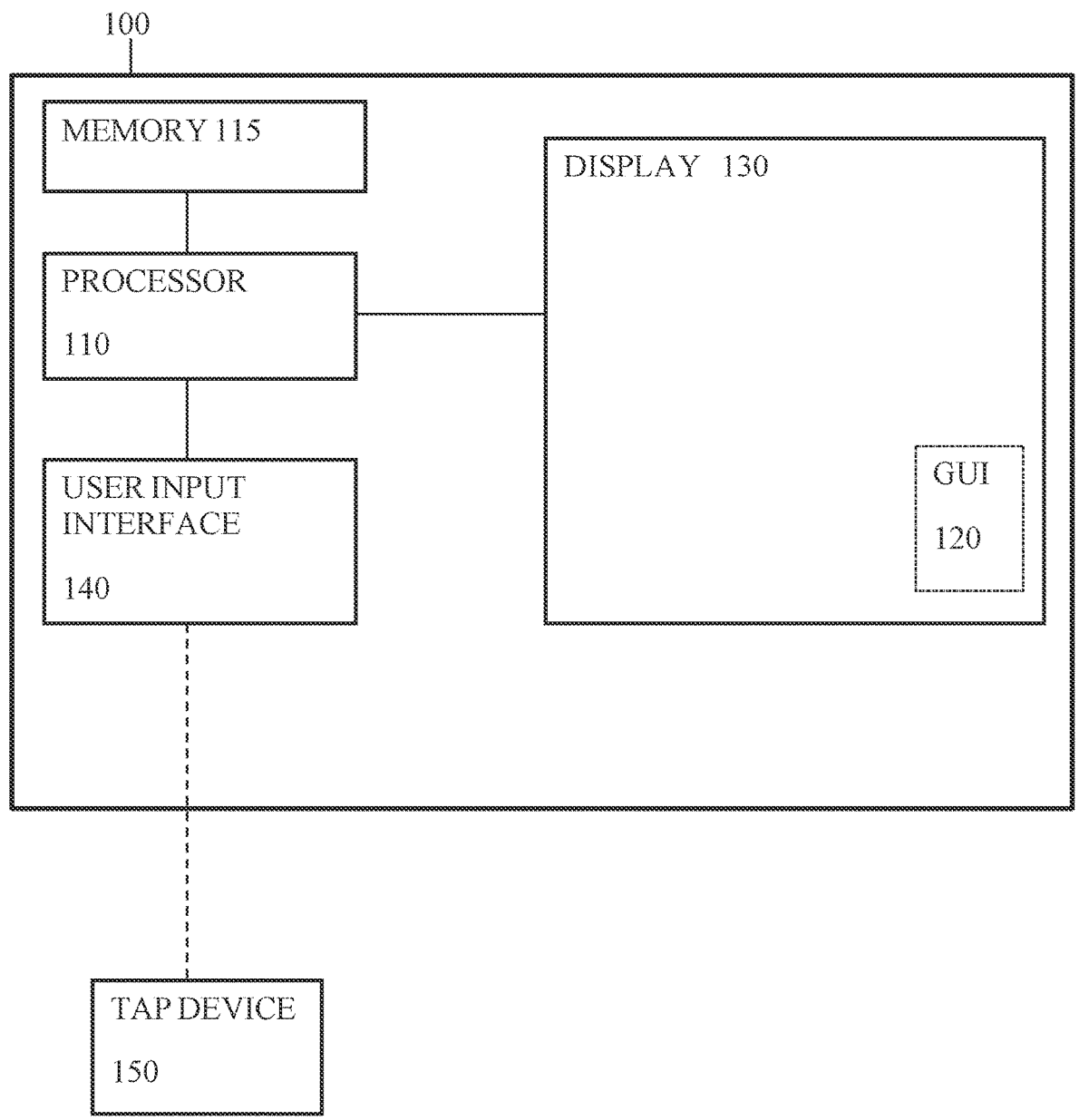
FIG. 1 shows an overview of a system for displaying a GUI controlled by a tap device.

FIG. 1 shows an overview of a system for displaying a GUI and a tap device for controlling and interacting with the GUI, according to one embodiment of the present invention. As shown in FIG. 1, a system 100 includes a processor 110 (which may be one or more processors or controllers) that controls display of a GUI 120 on a display 130. System 100 also includes memory 115 (which may be one or more memories and may include memories of different types, e.g., ROM and RAM). Memory 115 can store instructions to be executed by processors 110, and can store data for controlling and/or displaying GUI 120 on display 130. Those skilled in the art that there are a variety of known ways for displaying graphics and/or images on a display, and a separate memory controller and image memory, for example, can be used. Moreover, those skilled in the art will appreciate that FIG. 1 shows a schematic overview of major functional components, and those components need not be contained within a single housing. For example, display 130 may formed as a separate device than the device containing processor 110, and/or external memory devices separate from the device containing processor 110 may be used.

In the embodiment illustrated in FIG. 1, display 130 is a conventional display screen such as a display screen of a computer, tablet, phone, or the like. However, in a VR or AR application, GUI 120 may be displayed on or projected onto a display of the VR or AR system (such as goggles or glasses). Furthermore, the GUI may be projected holographically using known projection techniques so that it appears to float in the air.

System 100 further includes a user input interface 140 that receives signals from a tap device 150 and provides the signals to the processor 110. Tap device 150 may be a tap device for providing input to a data entry system (e.g., alphanumeric characters and/or commands) as disclosed in U.S. Pat. No. 10,599,216, which is herein incorporated by reference in its entirety. Such a tap device can be adapted to control a GUI. In a preferred configuration, tap device 150 communicates with user input interface 140 via Bluetooth® communication, or another type of short range communication. However, those skilled in the art will appreciate that other wired or wireless types of connections may be used.

System 100 allows a user to interact with and control items such as applications, file folders, documents, etc. through tap-driven commands that control GUI 120, and the system will be referred to herein as a tap operating system, i.e., TapOS. (It should be noted that the TapOS system need not physically incorporate, for example, the memory, the display, or the user input interface. Rather, the term TapOS refers to the functionality for displaying and controlling a GUI as described herein, and the TapOS may interact with and utilize other components and devices without physically incorporating them. Moreover, the TapOS system need not be implemented using a separate processor or processors, but rather can be implemented as software executed by a main processor of a host system.)

Processor 110 controls display of GUI 120 and/or performs other operations (such as activating an application) based on the received signals from tap device 150. The signals received from tap device 150 may be raw signals that correspond to sensor signals from sensors of the tap device. Alternatively, tap device 150 may process sensor signals before transmitting signals to the system 100, so that the received signals indicate the finger or combination of fingers for which a tap was detected, and processor 110 then interprets those tap signals to determine what command is indicated by the tap signals. In particular, in a preferred embodiment, the received signals represent a specific combination of one or more fingers of a hand that contacted a surface during a tap event. (A tap event means the one or more fingers that contacted a surface during a time period of a predetermined length, indicating the user intended to tap those fingers simultaneously so as to constitute a single tap event.) Alternatively, processing may be performed by the tap device to send signals in a format representing specific commands, or to send signals representing some other data for which some processing has been done but further processing is performed by processor 110 to determine the indicated command.

Figure 2:
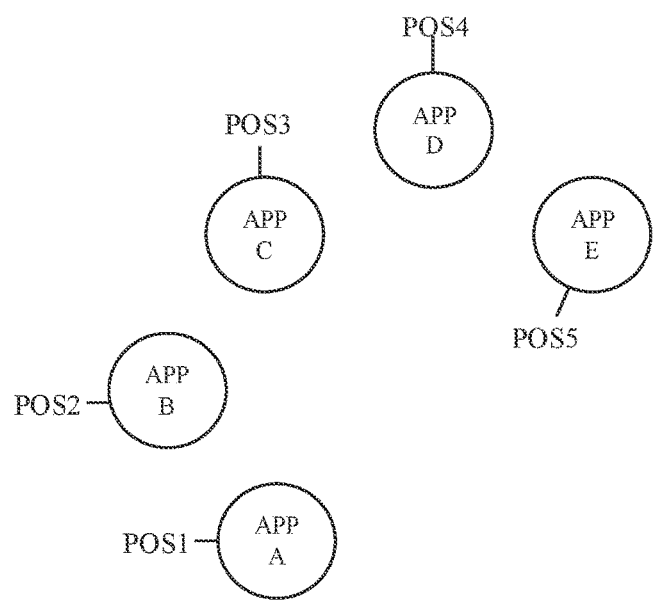
FIG. 2 shows an example of a GUI according to one preferred embodiment.

One example of GUI 120 according to the present invention is shown in FIG. 2. As depicted in FIG. 2, icons are displayed at five positions, which are labeled POS1, POS2, POS3, POS4, and POS5. The icons can represent various items such as applications to be activated, file folders to be opened, or menus (such as a settings menu) to be opened. In the example of FIG. 2, icons corresponding to five applications are shown, which are indicated as APP A, APP B, APP C, APP D, and APP E, and the icons are respectively displayed at POS1 through POS5. In this example, the icons have circular shapes, but other shapes may be used.

Figure 3:
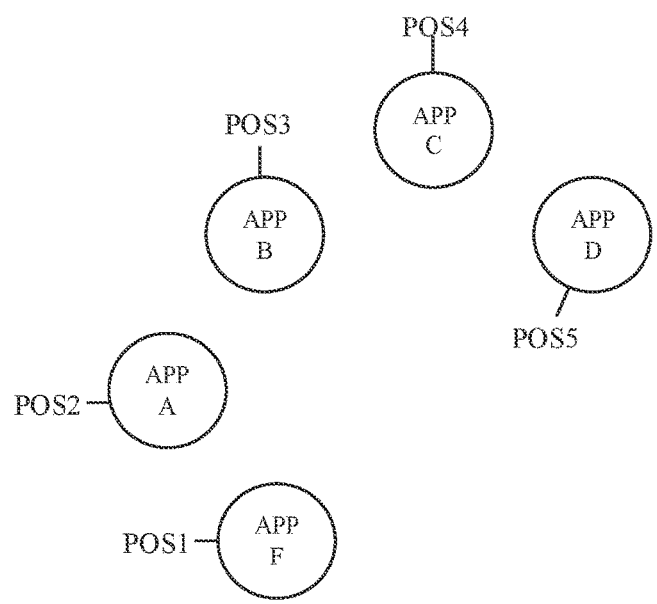
FIG. 3 shows the GUI of FIG. 2 after the icons are rotated one spot clockwise.

Although only five icons—corresponding to five items— are displayed at one time on GUI 120, more than five items or icons may be available. To display other available items, GUI 120 may be rotated virtually (as if it were a virtual dial), in response to commands received from tap device 150. For example, as shown in FIG. 3, if GUI 120 is rotated one spot clockwise, then APP A moves to POS2, APP B moves to POS3, APP C moves to POS4, and APP D moves to POS5. APP E is no longer displayed, whereas a new item APP F appears at POS1. If APP A through APP F are the complete set of items at this level of the interface, then rotating GUI 120 clockwise by one more spot would cause APP E to reappear at POS1, APP D to disappear from the display, and APP F, APP A, APP B, and APP C would each move one spot clockwise. The result of this further rotation is shown in FIG. 4.

Figure 4:
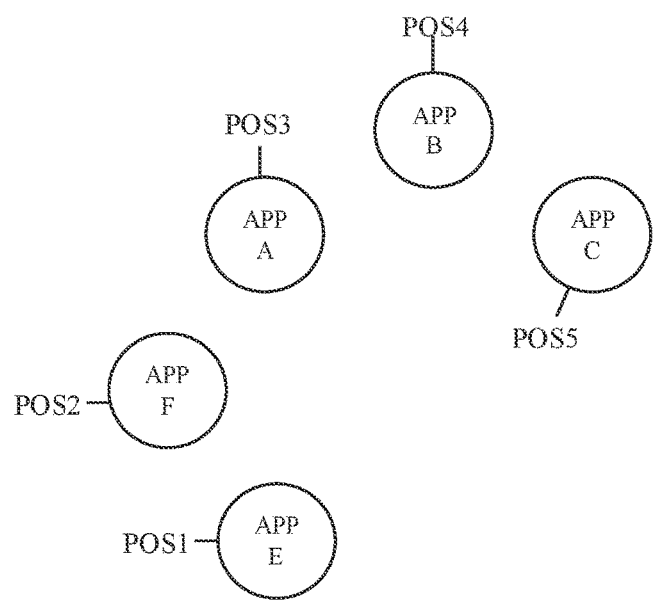
FIG. 4 shows the GUI of FIG. 3 after the icons are rotated one spot clockwise.
Figure 5:
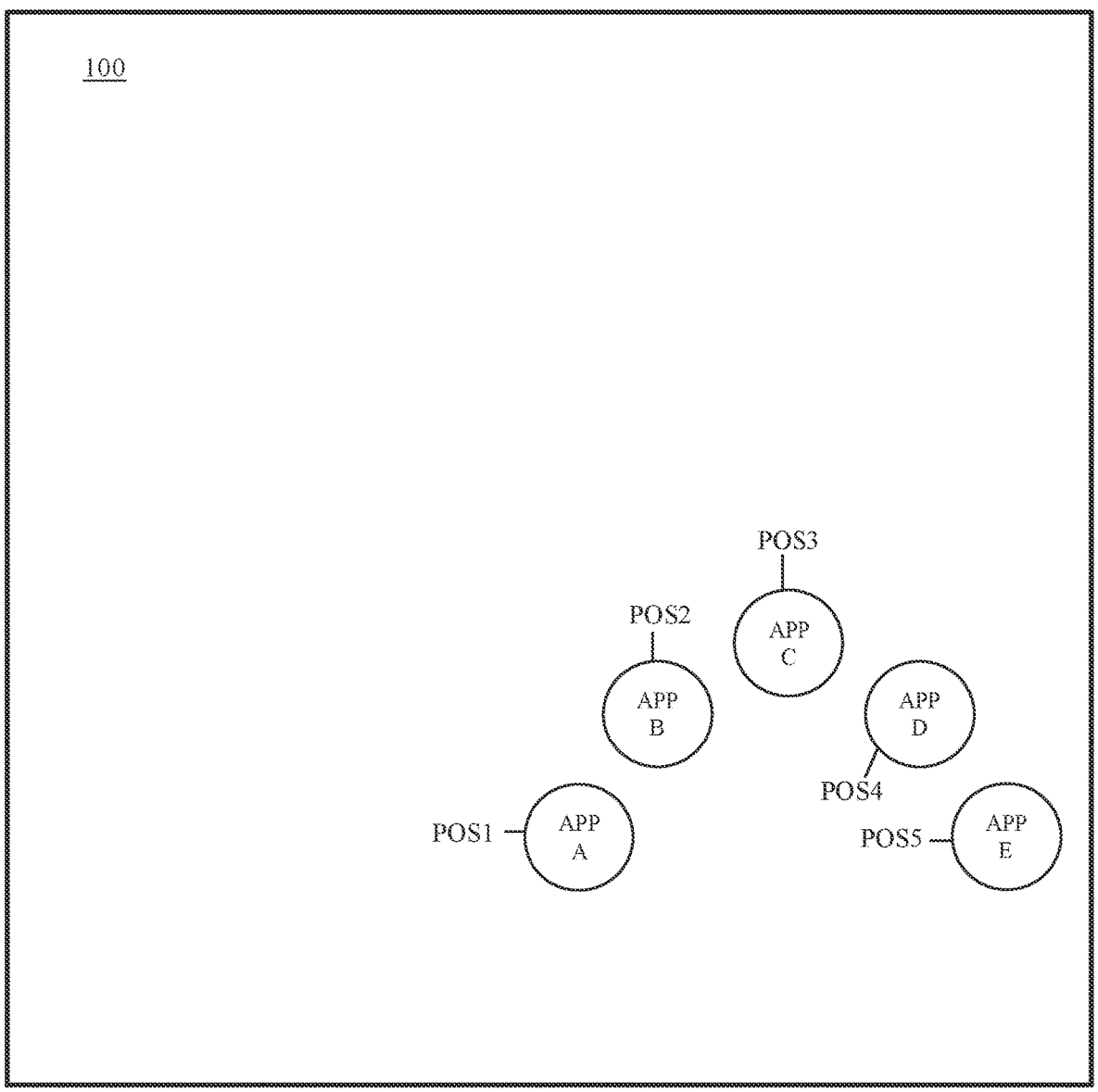
FIG. 5 shows a method of operation of a system to control a GUI according to one embodiment of the invention.

Although the partial ring of GUI 120 is displayed in a particular orientation in FIGS. 2-4, the orientation can be changed to better suit a user's preference or a particular scenario. FIG. 5 shows an alternative orientation of the icon positions.

One preferred example of controlling and interacting with GUI 120 using tap device 150 will be explained next. In this example embodiment, processor 110 interprets the tap signals received from tap device 150 to generate the following kinds of commands:

1—Tapping all fingers toggles the GUI between "on" and "off", i.e., visible and not visible. (That is, the entire GUI can disappear when not in use—either in response to the user tapping all fingers or after a predetermined time period in which no tap signals are received—and the user can bring up the GUI for use by tapping all fingers against a surface at the same time.)

2—Tapping with the fingers on the left-hand side of the hand rotates the icons counterclockwise.

3—Tapping with the fingers on the right-hand side of the hand rotates the icons clockwise.

4—Tapping any finger activates the corresponding icon. (That is, the function corresponding to the icon is activated, which could be initiating execution of a corresponding application, opening a file folder, displaying a menu screen, etc.)

5—Tapping the middle three fingers goes back to the previous screen.

For purposes of explanation of this preferred embodiment, consider the five fingers on a user's right hand to be numbered from 1 to 5, with 1 being the thumb, 2 being the index finger, 3 being the middle finger, 4 being the ring finger, and 5 being the little finger (i.e., the pinky finger). (Note that the thumb is considered a finger in this description.) In this illustration, with the tap device being worn on the right hand of a user, finger 1 corresponds to icon position 1, finger 2 corresponds to icon position 2, etc. That is, finger 1 corresponds to POS1, finger 2 corresponds to POS2, finger 3 corresponds to POS3, finger 4 corresponds to POS4, and finger 5 corresponds to POS5.

Of course, the system can be adapted for use when worn on the left hand, in which the numbering of fingers would be 5 for the thumb, 4 for the index finger, etc. As one example, a flag can be set, either through a software setting or a physical switch setting, which indicates whether the tap device is being worn on the right hand or the left hand. The processing that translates finger taps into commands, which may be done by the tap device itself or by the system receiving signals from the tap device, can use the flag to generate commands appropriate for which hand the tap device is being worn on.

With the above-mentioned right-handed numbering assumed, and where "X" means a finger taps a surface and "O" means the finger does not tap a surface, the following Table I indicates a set of commands generated by the tap device according to one preferred embodiment:

TABLE I

| Finger 1 | Finger 2 | Finger 3 | Finger 4 | Finger 5 | Command |
|---|---|---|---|---|---|
| X | X | X | X | X | Toggle display of GUI on and off |
| X | X | O | O | O | Rotate counterclockwise |
| O | O | O | X | X | Rotate clockwise |
| X | O | O | O | O | Activate icon 1 |
| O | X | O | O | O | Activate icon 2 |
| O | O | X | O | O | Activate icon 3 |
| O | O | O | X | O | Activate icon 4 |
| O | O | O | O | X | Activate icon 5 |
| O | X | X | X | O | Return to previous screen |

As mentioned above, appropriate modification can be made if the tap device is worn on the left hand rather than on the right hand. For example, whereas simultaneous taps by the thumb and index finger (fingers 1 and 2) may be interpreted as "Rotate Counterclockwise" when the tap device is worn on the right hand, instead it would be simultaneous taps by the pinky finger and ring finger (i.e., fingers 1 and 2 in a left-handed configuration) that correspond to the "Rotate Counterclockwise" command when the tap device is worn on the left hand.

While in the example above the command to rotate the icons counterclockwise involves tapping only the leftmost two fingers (specifically, the thumb and index finger in the right-handed configuration), in an alternative embodiment the mapping of tap combinations to commands can be defined so that the middle finger is included for this command. That is, tapping fingers 1, 2, and 3 (thumb, index finger, and middle finger) at the same time generates the command to rotate counterclockwise. Similarly, tapping fingers 3, 4, and 5 (middle finger, ring finger, and pinky finger) at the same time can generate the command to rotate clockwise. Furthermore, the tap commands could be defined so that either fingers 1 and 2, or fingers 1, 2, and 3, generates the command to rotate counterclockwise, and similarly with the command to rotate clockwise.

Figure 6A:
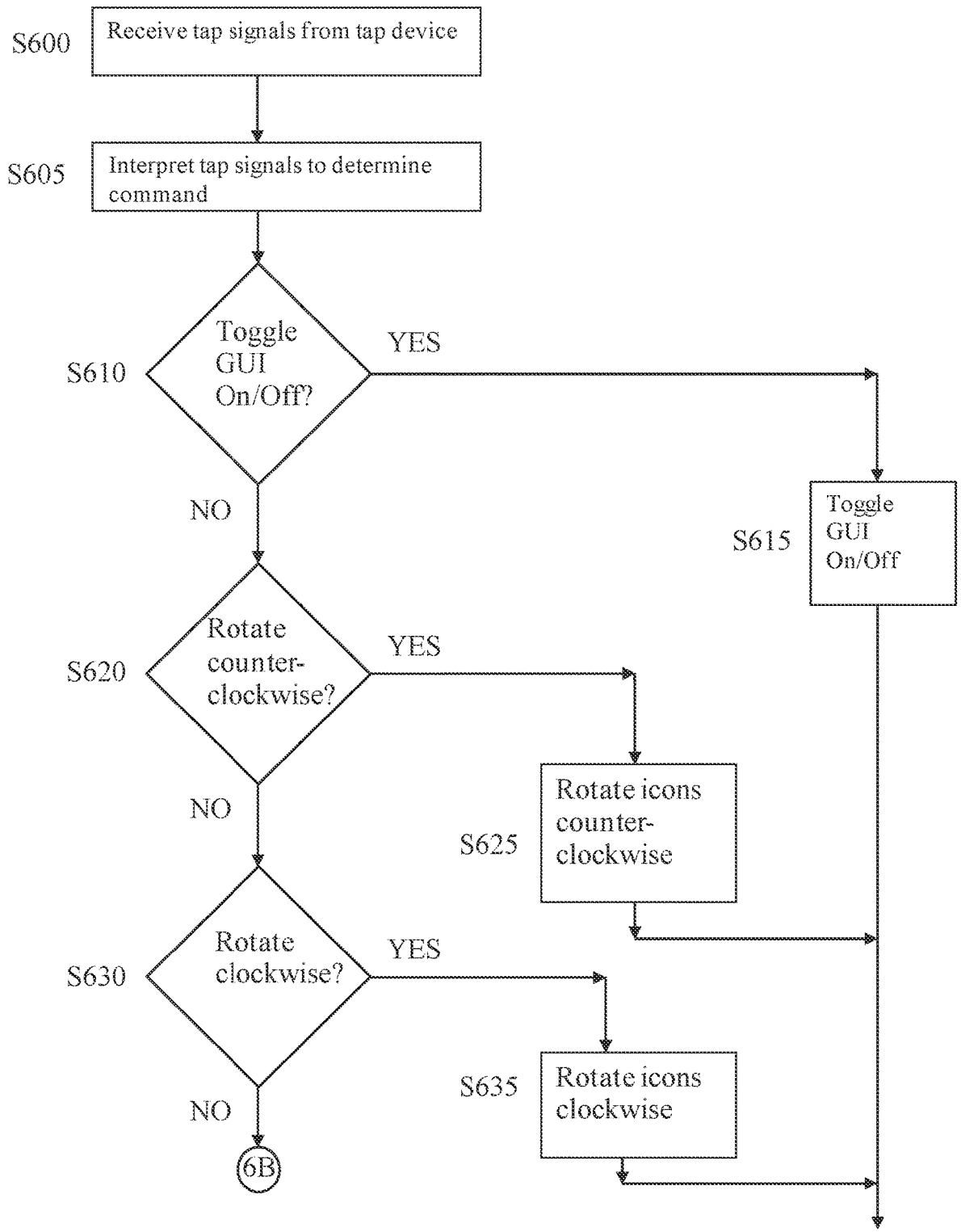
FIGS. 6A, 6B, and 6C show an example process flow for controlling a GUI according to one embodiment of the invention.
Figure 6B:
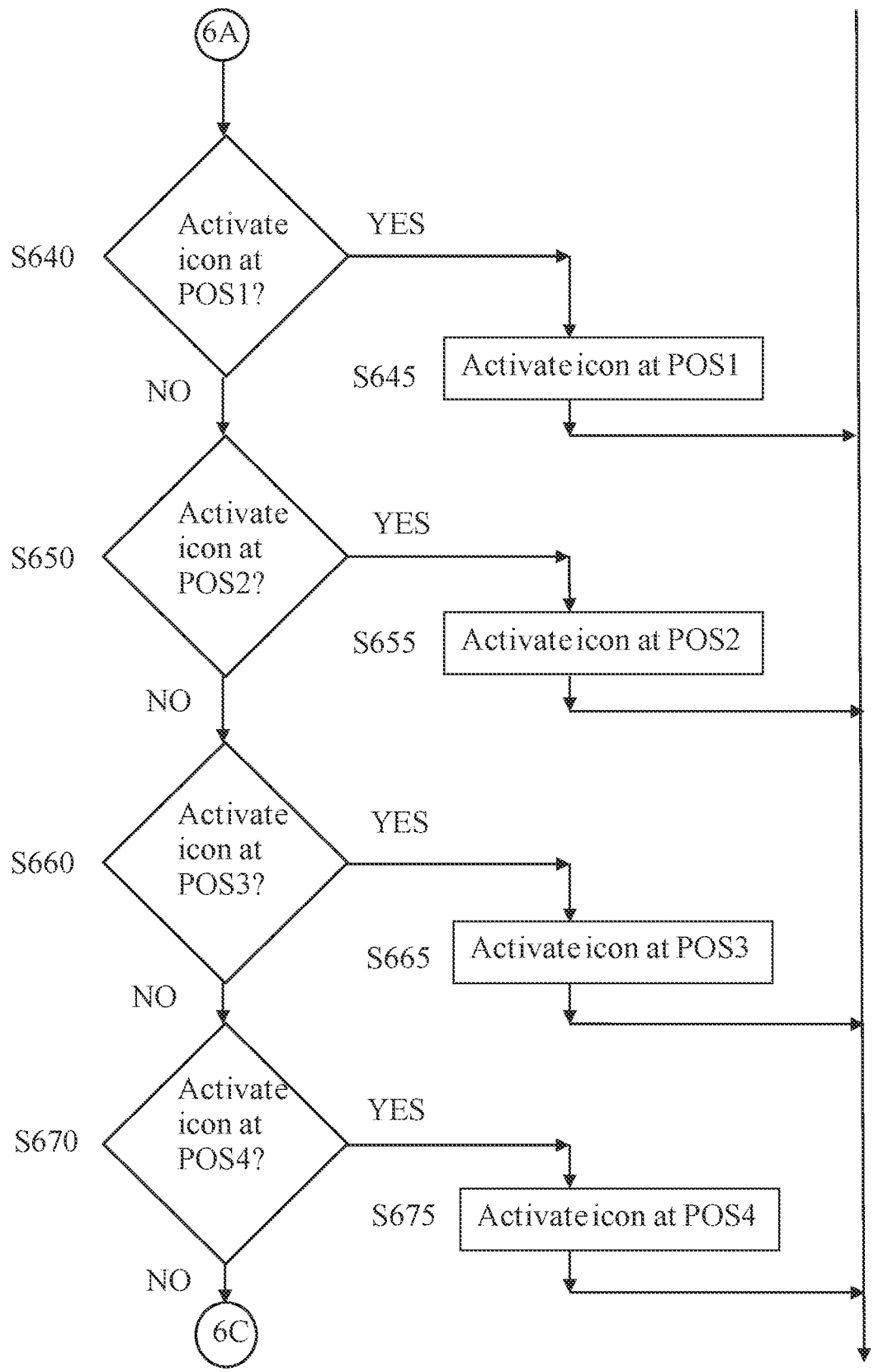
Figure 6C:
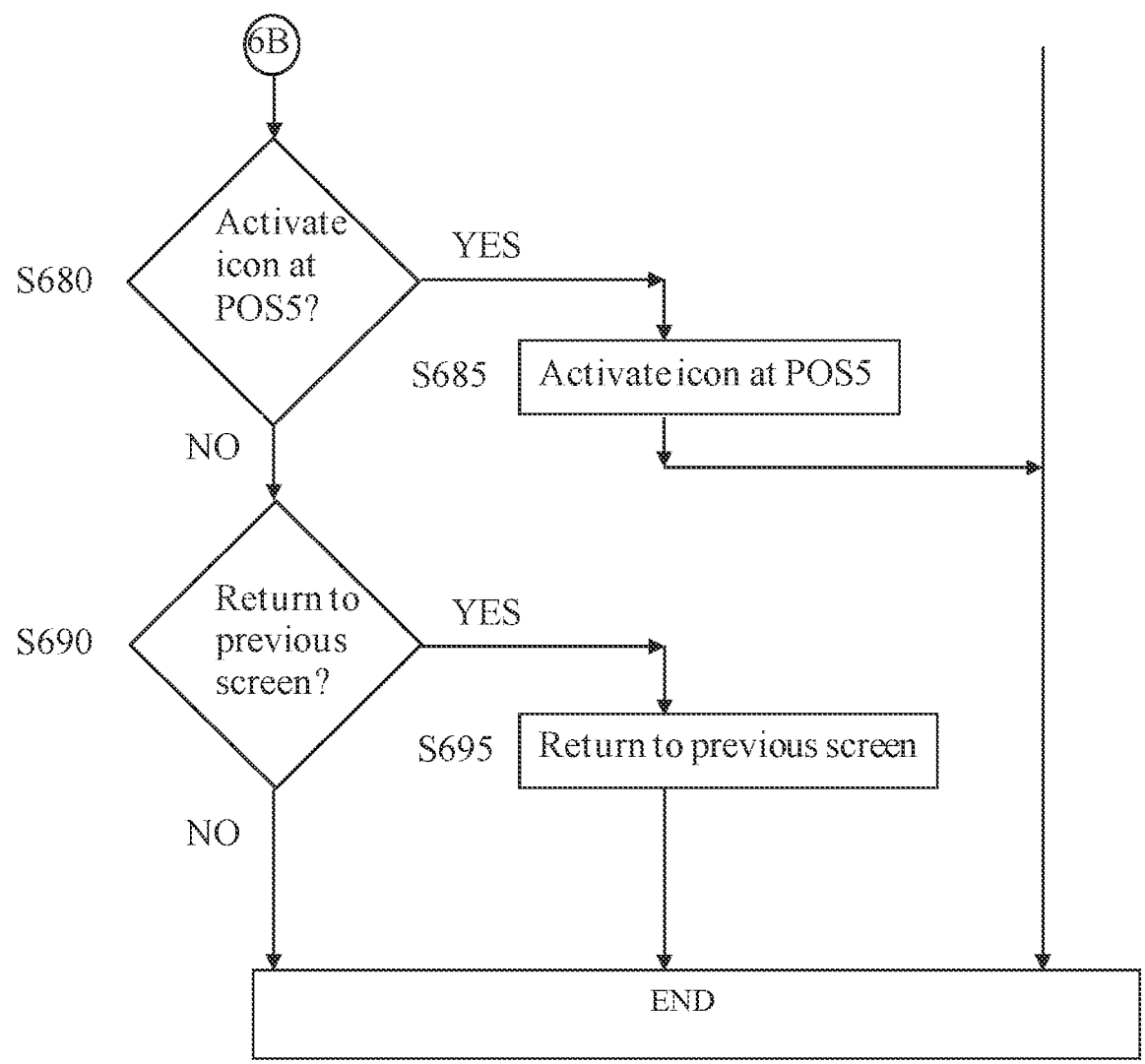

Operation of system 100 according to one preferred example will be described with respect to FIGS. 6A through 6C. In S600, the TapOS system receives tap signals from the tap device. In this example, the received signals indicate, for a specific tap event, which fingers tapped against a surface. That is, the transmitted signals correspond to the information in Table I above regarding the state of each finger at the time of a tap event. In S605, the TapOS system (for example, processor 110) interprets the tap signals to determine the corresponding command. For example, the information in Table I can be used to determine a command based on the received tap signals. The interpreted commands may, for example, be designated numerical values, such as "1" for toggle the GUI on/off, "2" for activate icon at POS1, "3" for activate icon at POS2, "4" for activate icon at POS3, "5" for activate icon at POS4, "6" for activate icon at POS5, "7" for rotate counterclockwise, "8" for rotate clockwise, and "9" for return to previous screen.

The process then determines which command was indicated by the received tap signals and performs an appropriate function. More specifically, in S610 it is determined whether the command to toggle the GUI on and off was received. If Yes, then in S615 the state of the GUI is toggled. That is, if the GUI is currently displayed then it is turned off, and if it is not currently displayed then it is turned on. For example, a flag stored in memory can indicate the current state and based on the value of the stored flag the display of the GUI can be switched to the opposite state. After the display state of the GUI is toggled, processing for that particular received command ends. Of course, all processing does not end. Rather, in a preferred example the process (in so far as it relates to receiving and processing tap commands) would enter a wait state and await receipt of the next tap signals from the tap device.

If the determination is No in S610, then in S620 it is determined whether the command to rotate the GUI counterclockwise was received. If Yes, then in S625 the icons displayed in the GUI are rotated counterclockwise by one spot and processing for the command ends. If the determination is No in S620, then in S630 it is determined whether the command to rotate the GUI clockwise was received. If Yes, then in S635 the icons displayed in the GUI are rotated clockwise by one spot and processing for the command ends. If the determination is No in S630, then the process proceeds to S640.

In S640, it is determined whether the command to activate the icon at POS1 was received. If Yes, then in S645 the icon at POS1 is activated and processing for the command ends. The function performed to "activate" the icon will depend on the type of item corresponding to the icon. For example, if the icon corresponds to an app, then activating the icon will cause the app to be launched. If the icon corresponds to a file, then activating the icon will cause the file to be opened. (A service of the host OS can be used, for example, to identify a default application associated with a file based on the file type and automatically open the file with the default application.) If the icon corresponds to a folder, then the folder will be opened to display the subfolders and files contained in the folder. If the icon corresponds to a menu, then menu options or submenus will be displayed.

If the determination is No in S640, then in S650 it is determined whether the command to activate the icon at POS2 was received. If Yes, then in S655 the icon at POS2 is activated and processing for the command ends. If the determination is No in S650, then in S660 it is determined whether the command to activate the icon at POS3 was received. If Yes, then in S665 the icon at POS3 is activated and processing for the command ends. If the determination is No in S660, then in S670 it is determined whether the command to activate the icon at POS4 was received. If Yes, then in S675 the icon at POS4 is activated and processing for the command ends. If the determination is No in S670, then in S680 it is determined whether the command to activate the icon at POS5 was received. If Yes, then in S685 the icon at POS5 is activated and processing for the command ends. If the determination is No in S680, then in S690 it is determined whether the command to return to the previous screen was received. If Yes, then in S695 the displayed GUI is returned to the previous screen. If the determination is No in S690, then processing for the command ends. (If validity checking is performed, as discussed below, to ensure that the received command is a valid command, then the determination should never be No in S690 because if the process reaches S690 then the command must be the command to return to the previous screen.)

In a preferred example, the processing also includes validity checking that checks whether the received tap signals correspond to a valid command. If not, appropriate action can be taken, such as displaying an indication on the GUI that an invalid tap command was received. Those skilled in the art will appreciate that there are many variations in how to handle different situations. For example, if the GUI is not currently displayed, then all commands based on received tap signals could simply be ignored (other than the command to toggle the GUI on). Alternatively, if a command is received while the GUI is not being displayed, and it is not the command to toggle the display of the GUI, a message could be displayed on a screen.

Those skilled in the art will appreciate that there are many variations in how hardware and/or software can perform an appropriate function based on a command. For example, rather than sequentially determining whether each command was received, the received tap signals could be used by selection circuitry or software to route process flow to an appropriate function.

Figure 7:
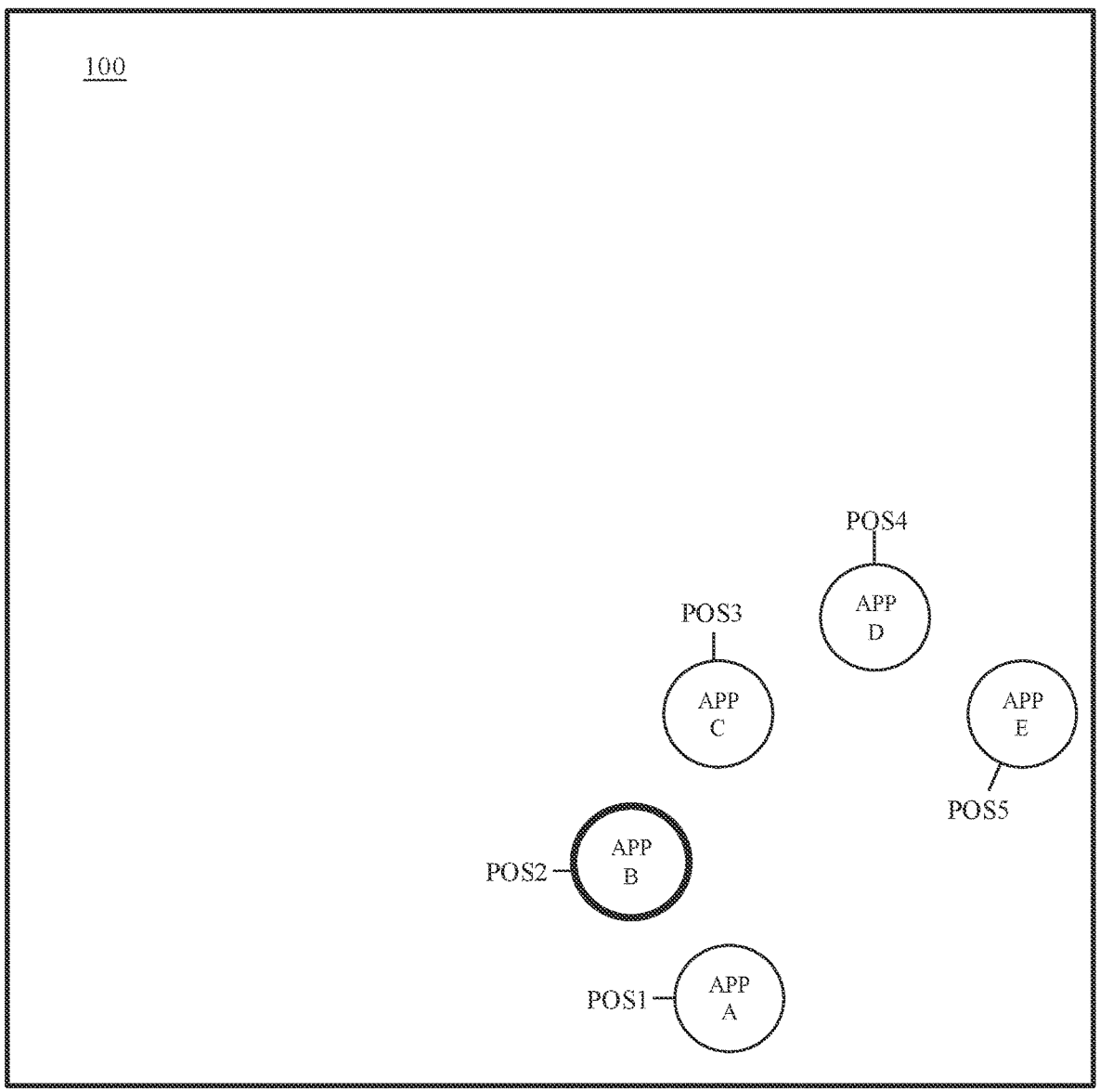
FIG. 7 shows an example of an embodiment where a selected icon is indicated by a ring around the perimeter of the icon.

Those skilled in the art will appreciate that the commands corresponding to respective tap combinations can be customized in different ways. For example, while it may be desirable to activate an icon directly by tapping the corresponding feature, in some scenarios a two-step activation process might be preferable. That is, tapping a finger will cause the corresponding icon to be selected (and displayed in a manner that indicates that the icon is selected, such as with greater brightness than the other icons or with a ring around the perimeter of the icon), and then tapping all fingers simultaneously causes the selected icon to be activated. (In this case, a different tap combination could be used to toggle the display of the GUI on and off, such as tapping the thumb and pinky finger simultaneously.) FIG. 7 shows an example in which the icon at POS2 has been selected, and it is surrounded by a thick ring (which can be black or set to some other color to emphasize the selected icon). The selected icon can then be activated by tapping all fingers simultaneously. With this two-step activation process, the user can confirm which icon is selected before activating it. Alternatively, a two-step activation process could be performed by using two taps of the finger corresponding to a position to activate the icon at that position. For example, tapping finger 1 (the thumb) once causes the icon at POS1 to be selected (with the selection indicated in some manner, as discussed above), and then tapping finger 1 a second time while the icon at POS1 is already selected will activate the icon.

Another alternative is to have a predetermined position on the GUI designated as a default position. For example, in the arrangement shown in FIG. 2, POS1 could be designated as the default position. The icon located at the default position can be activated by a predetermined tap combination (e.g., only the middle finger, only the index finger, or the thumb and pinky finger). This alternative embodiment provides the user a different way to confirm which icon will be activated, since only the icon currently at POS1 can be activated and an icon in a different position would never be activated. Hence, the user can focus attention on POS1 to be certain of which icon will be activated when the tap combination for activating an icon is tapped.

Figure 8:
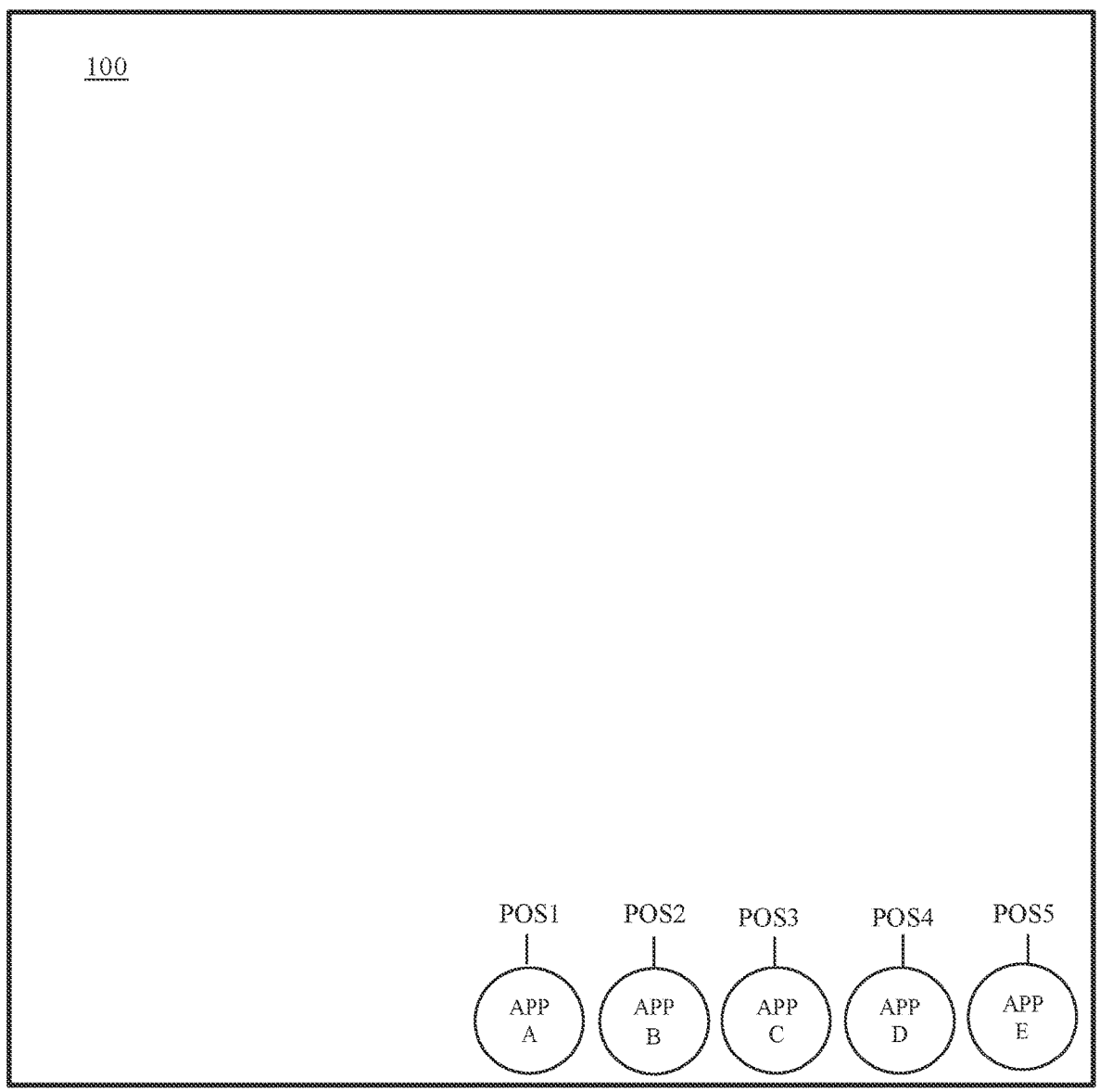
FIG. 8 shows an example of an embodiment where the icons of the GUI are arranged in a linear fashion.

In another alternative example, the icons may be displayed in a line rather than in a ring (preferably the line is horizontal or vertical, but it could be at a different angle). FIG. 8 shows an example where five icons are displayed linearly along a horizontal line. In this embodiment, rather than rotating clockwise or counterclockwise, appropriate tap combinations can be used to scroll the icons left or right along the line. For example, tapping the left two fingers scrolls left, and tapping the right two fingers scrolls right.

As mentioned above, only five icons are displayed in the GUI at any time. With this configuration, there is always a one-to-one relationship between the displayed icons and the fingers of the hand wearing the tap device. This makes it possible to always select any displayed icon easily and reliably by tapping a single corresponding finger. However, the total number of available icons is not limited to five, because icons can be rotated onto and off of the GUI as virtual rotation occurs.

Figure 9:
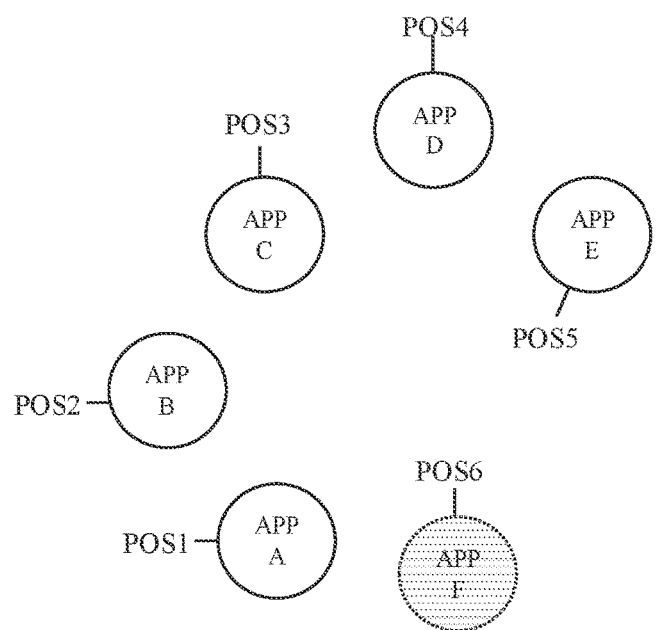
FIG. 9 shows an example of an embodiment in which unavailable items are displayed, but in a manner different than available items.

Although in the example shown in FIGS. 2-4 the unavailable icons (that is, APP F in FIG. 2, APP E in FIG. 3, and APP D in FIG. 4) are not displayed at all, an alternative example is to display the unavailable icons but in a manner that clearly indicates that they are currently unavailable for user interaction. FIG. 9 shows an example of this. In FIG. 9, it is assumed that there are a total of six items at the currently displayed level. In the view shown in FIG. 9, APP A through APP E are displayed in positions POS1 through POS5, respectively, and are available for user interaction. APP F, which is currently unavailable for user interaction, is displayed at POS6 in a way to indicate that it is not currently available, for example, in a grayed-out manner. With this alternative arrangement, there remains only five items available for interaction, to retain the one-to-one correspondence between items and fingers, but the user can see how many other items are included in the current layer or level of the GUI, even though those other items are unavailable for interaction until rotated to one of POS1 through POS5.

Figure 10:
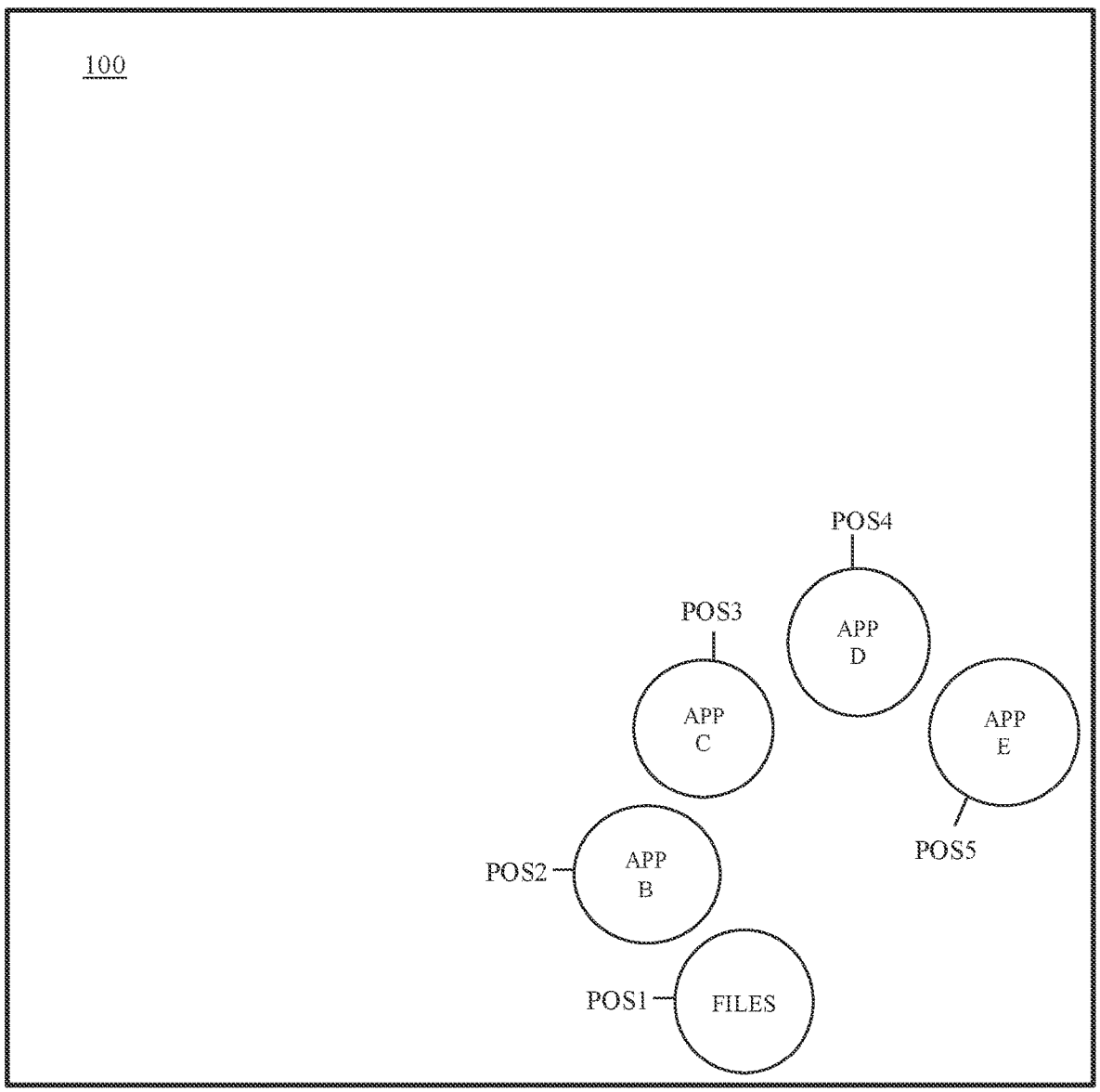
FIG. 10 shows an example in which one icon available for selection is a top-level folder for browsing a hierarchical system of folders and files.

In the examples of icons displayed on the GUI in FIGS. 2-5 and 7-9, the items available for user interaction are applications, i.e., when the user activates an icon using tap commands an application will be launched. (As will be discussed further below, the TapOS can also be configured to work within an application, so that the user can use tap-driven commands and GUI 120 to control and interact with an application after it is launched.) However, as described above, the available items can also include folders, files, menus and associated menu options, and other types of items. FIG. 10 shows an example where one of the items available at the top level of GUI 120 allows browsing of a file structure (for example, similar to File Explorer in a Windows® operating system. In FIG. 10, the item at position POS1 is labeled FILES, while the items in positions POS2 through POS5 correspond to APP B through APP E, respectively.

Figure 11:
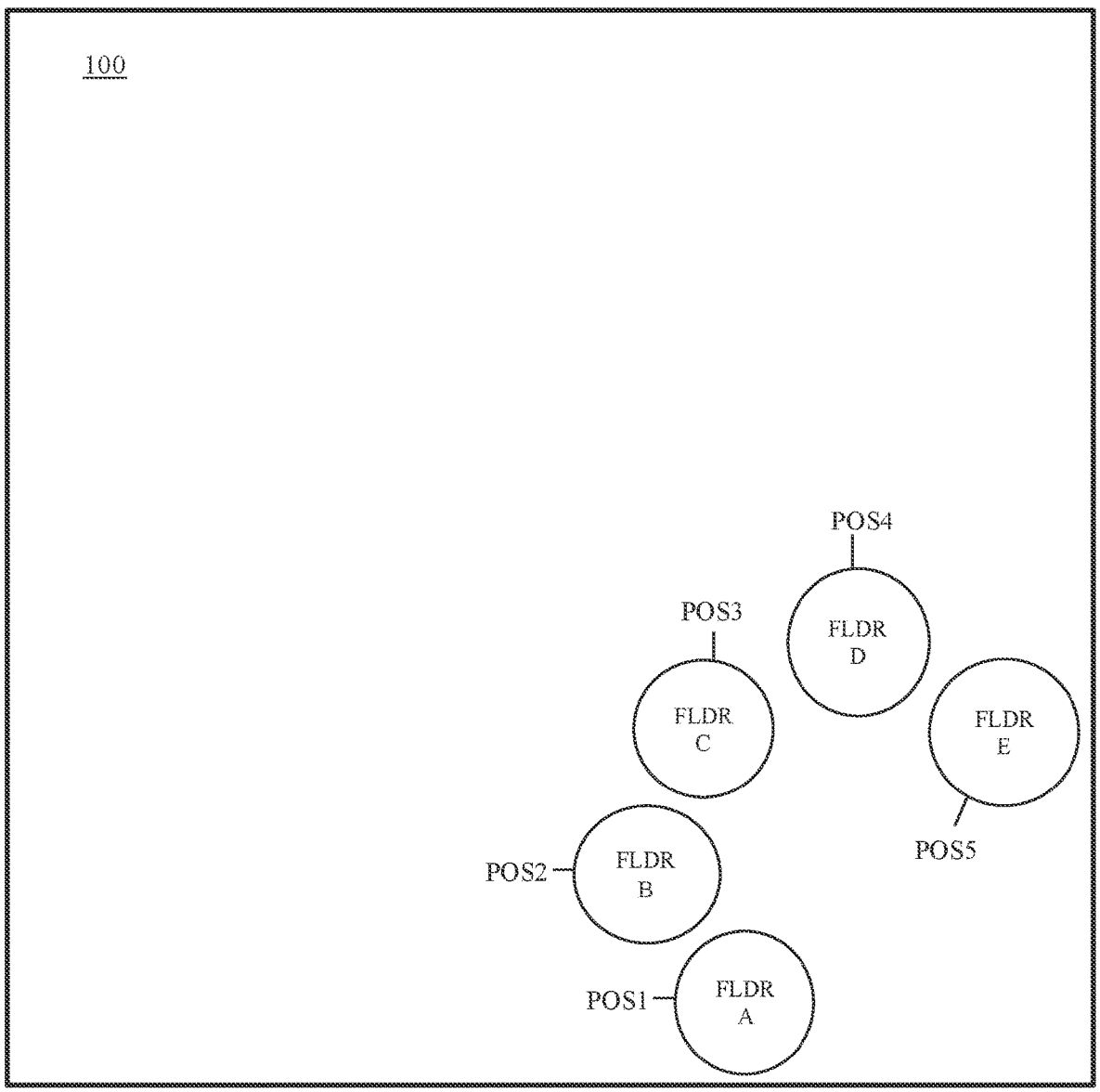
FIG. 11 shows an example of icons corresponding to available subfolders in a level below the top-level.
Figure 12:
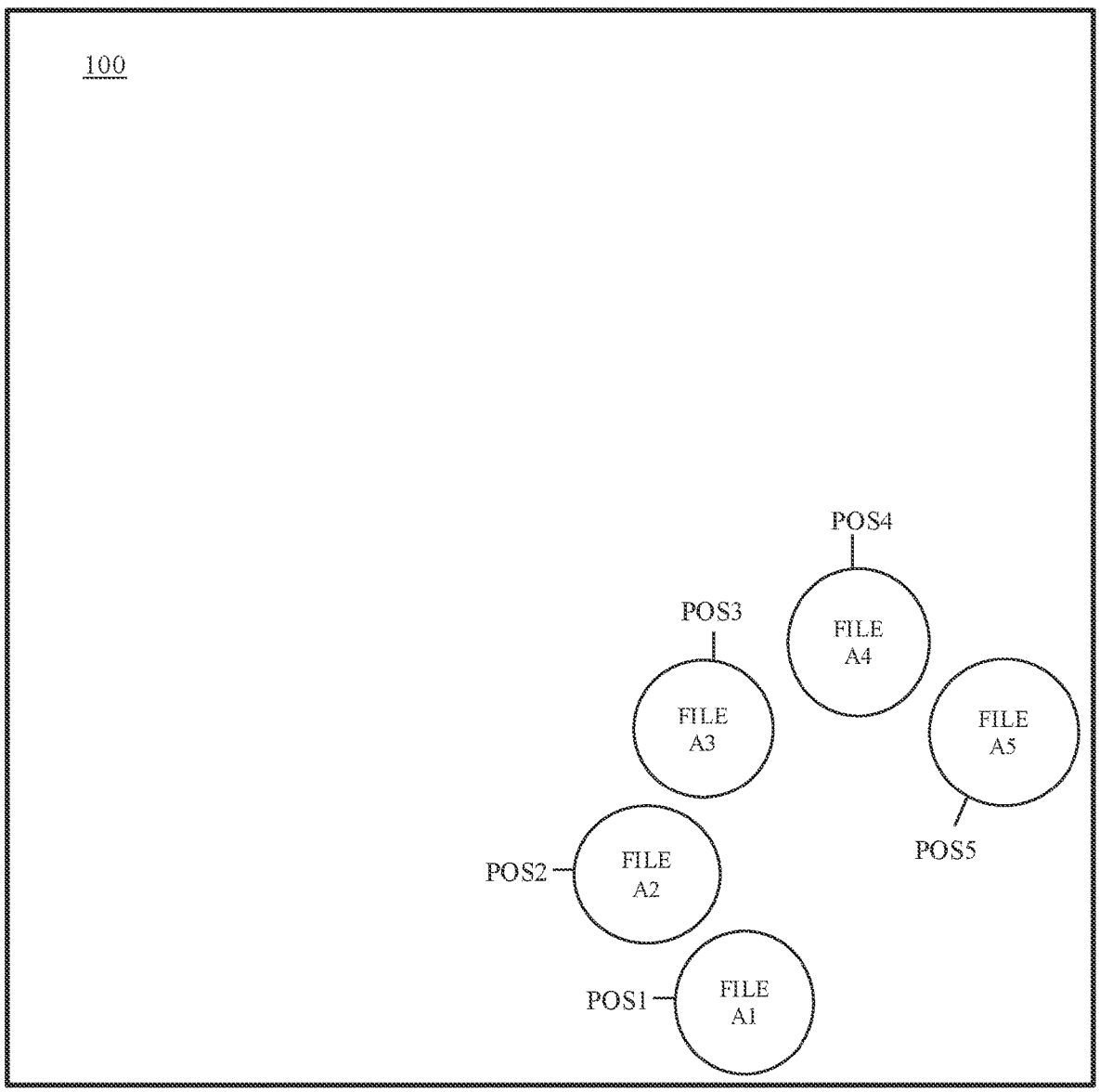
FIG. 12 shows an example of icons corresponding to files contained in a subfolder.

If the icon corresponding to FILES in FIG. 10 is activated by the user, another level of display is opened in GUI 120. In this example, as shown in FIG. 11, icons corresponding to five folders (FLDR A, FLDR B, FLDR C, FLDR D, and FLDR E) are displayed. Furthermore, as shown in FIG. 12, if the icon corresponding to FLDR A is activated, then icons corresponding to five files (FILE A1, FILE A2, FILE A3, FILE A4, and FILE A5) are displayed. In this manner, the TapOS system can be used to browse through various levels of folders and files and to select a desired file to open. While browsing various levels of the GUI, the TapOS system keeps track of the current display level and the previous screen, so that the previous screen can be displayed in response to a command to return to the previous screen (for example, tapping the three middle fingers in the example of Table I).

As mentioned above, an icon displayed by GUI 120 may also correspond to a menu, such as a settings menu. When the menu icon is activated, another level of items is displayed, which correspond to various menu items. Thus, a user can navigate through various menus and submenus, select a setting item to be adjusted, and adjust the item using tap commands.

Figure 13:
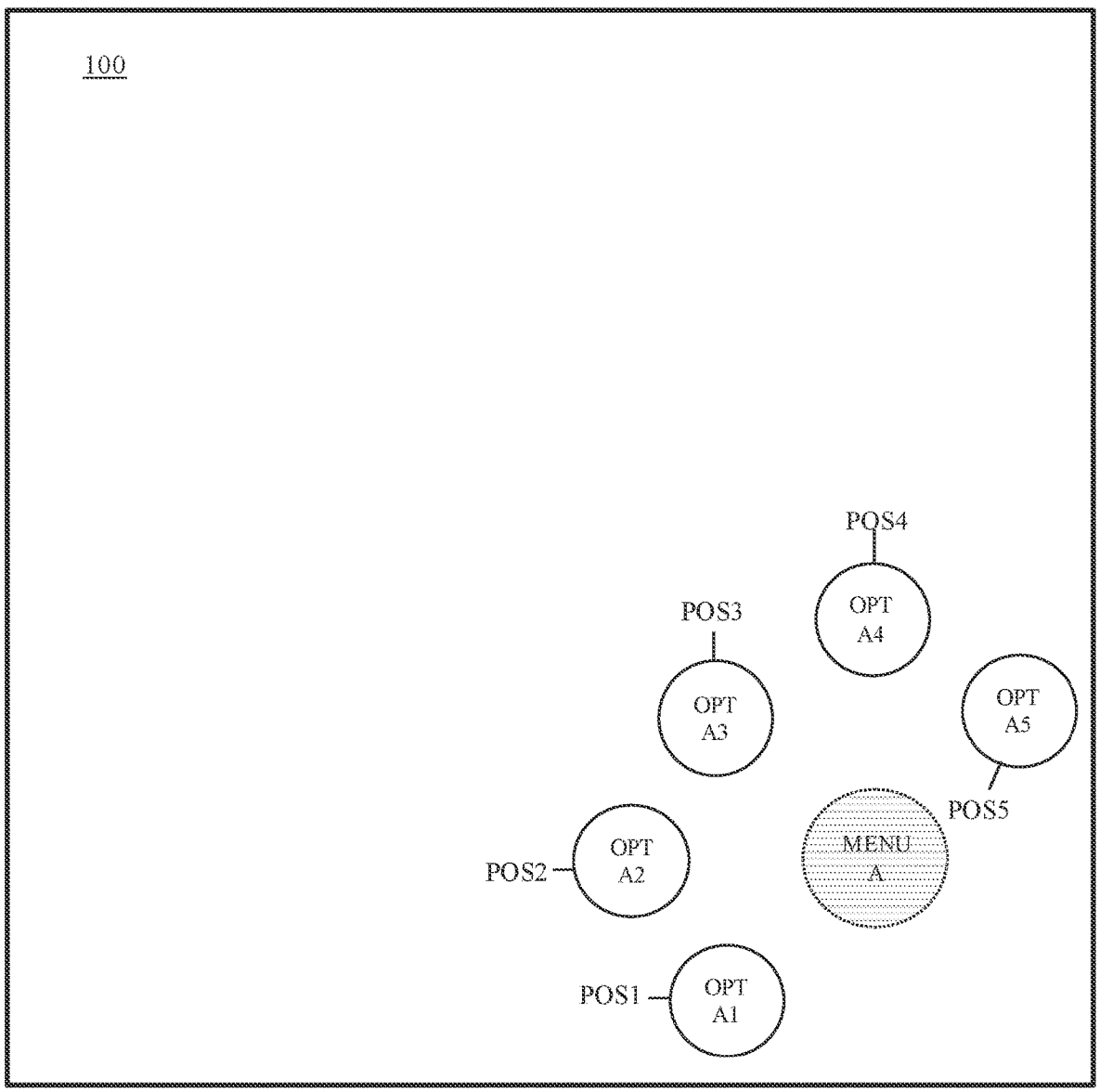
FIG. 13 shows an example of icons corresponding to menu options available after activating a menu icon, where the menu icon is also displayed but in a manner different than the menu options.

In the examples described above, an icon disappears when it is activated, and the GUI then displays another level of icons in accordance with an activated icon. As an alternative example, the activated icon can be displayed together with the new level of displayed icons. FIG. 13 shows an example, which assumes that one icon displayed at the next higher level is MENU A. After a user activates the icon corresponding to MENU A, GUI 120 displays five icons corresponding to OPT A1 through OPT A5, which are menu options on MENU A. In addition, at the rotational center of the five icons, an icon corresponding to MENU A is displayed. In this example, the icon corresponding to MENU A is displayed with a different appearance than the other icons (such as with a grayed-out appearance), to indicate to the user that it is not a selectable icon. Rather, the icon for MENU A at the center of GUI 120 serves to remind the user which menu has been selected. Similarly, if an app is launched then icons representing options available within the app can be displayed in GUI 120 while displaying an icon corresponding to the app (for example, in a grayed-out manner at the center of rotation) to remind the user which app is open.

As mentioned above, GUI 120 can be used to navigate through menus and submenus and select menu options. This can include menu options relating to GUI 120 itself, or to set-up of tap device 150 (such as configuring the tap device to be worn on the right hand or the left hand).

With respect to GUI 120, menu options can permit a user to adjust, for example, the size or shape of icons, the arrangement of icons (e.g., as a virtual dial or a linear arrangement of icons), or the position where GUI 120 will be displayed on display screen 130. For example, when rendering display data for display on a screen, stored information about the location to display the GUI, such as the center coordinates of the GUI, can be retrieved and used in the rendering.

According to another example, the radius from the center of rotation of a virtual dial to an icon can be changed automatically by the system in accordance with the number of items available at the current level of display. For example, the radius can be increased so that icons are farther from the center of rotation (and optionally resized automatically to be smaller) when there are more items available in a given display level. The radius can correspond to the radius of circle that would be needed to fit all of the items, if more than five items were to be displayed. In this manner, a user is provided a visual indication of how many items are available at the display level based on how far the icons are from the center of rotation, even if only five icons are actually displayed. This gives the user an idea of how many currently unavailable icons are not visible but can become available upon sufficient rotation. On the other hand, a maximum radius can be set if a user desires to keep the maximum size of GUI 120 below a certain size, to avoid obscuring other content displayed on display 130. In another example embodiment, the radius of the circle is constant but the size of individual icons varies in relation to the number of items available in the current display level (this could be either a direct relationship or an inverse relationship). Thus, even if only five icons are displayed, the size of the icons can provide the user a general indication of the total number of items available in the display level.

According to another example, tap device 150 can include not only one or more sensors for detecting tapping of fingers against a surface but also actuators for sending feedback (such as vibrations) to the fingers of the hand wearing the tap device. In other words, bi-directional communication between system 100 and tap device 150 is possible. An example of a tap device having such bi-directional communication capability is shown in U.S. Pat. No. 11,009,968, which is incorporated herein by reference in its entirety. With this arrangement, a user can receive feedback from system 100 regarding the user's interaction with GUI 120.

For example, if a user sends a tap command using tap device 150 to activate an application corresponding to an icon displayed at POS1, by tapping finger 1 (the thumb), then processor 110 will interpret the command and launch the application corresponding to the icon at POS1. After launching the application, processor 110 can send a signal back to tap device 150 to cause an actuator associated with the thumb to vibrate briefly, thereby confirming activation of the icon corresponding to the thumb (i.e., the icon at POS1).

Figure 14:
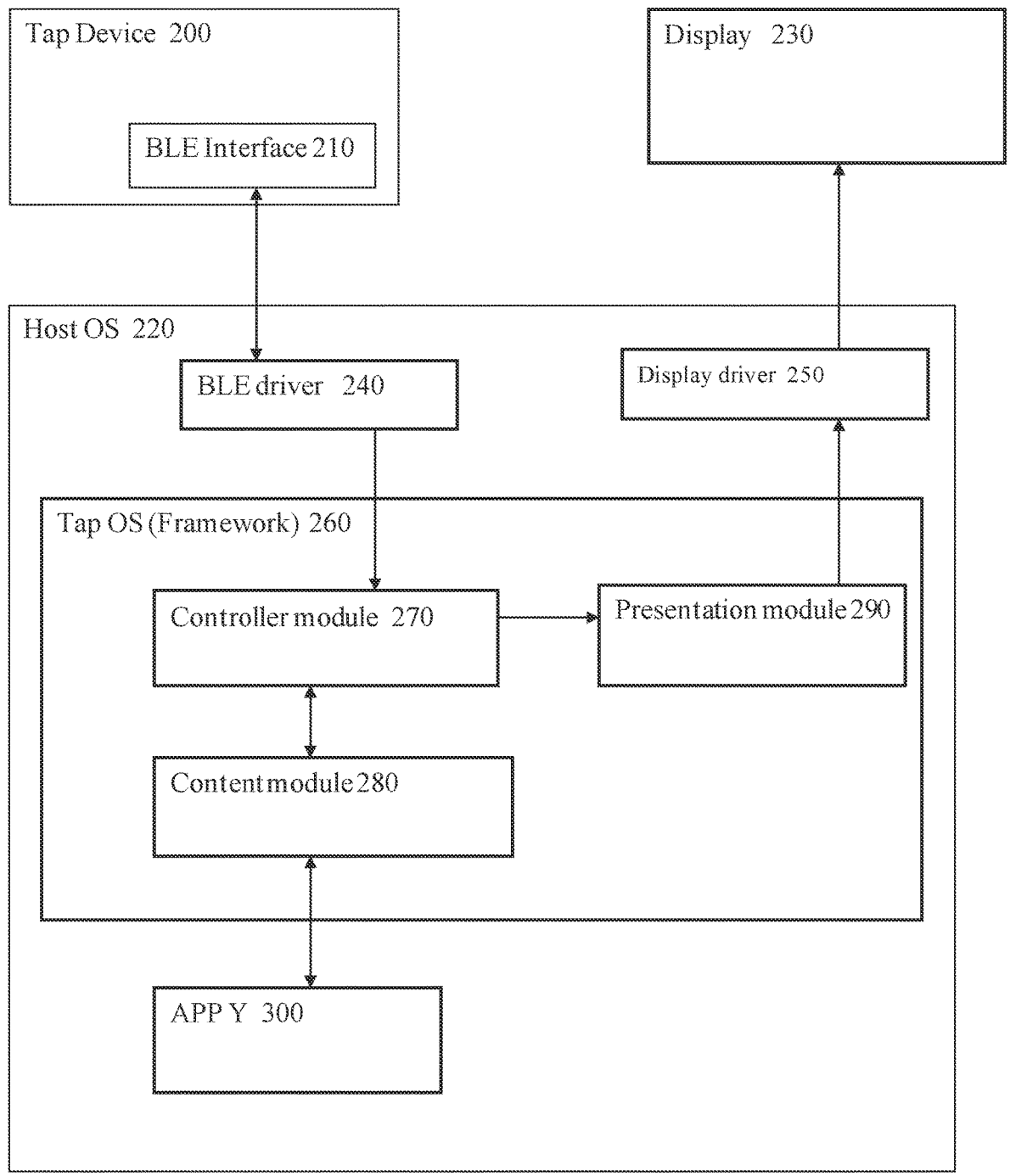
FIG. 14 shows a data flow diagram according to another example embodiment of a GUI.

FIG. 14 is a diagram showing data flow for controlling the display of the GUI based on tap commands according to one example embodiment. As shown in FIG. 14, a tap device 200 communicates with a Host OS 220, which in turn controls a display 230. Tap device 200 includes a BLE (Bluetooth Low Energy) Interface 210. Host OS 220 includes a BLE driver 240, a display driver 250, a TapOS framework 260, and an application, for example, APP Y 300. The Tap OS framework includes a controller module 270, a content module 280, and a presentation module 290.

As mentioned above, signals representing which finger has tapped a surface can be processed to produce commands in the tap device, processed in a processor that implements the TapOS system in a host system, or by a combination of both. In the description of an example of data flow with respect to FIG. 14, it will be assumed that the tap device processes and interprets finger taps and sends numerical data to the TapOS framework indicating a particular command. For example, a "1" may indicate all fingers tapped, a "2" may indicate finger 1 (thumb) tapped, a "3" may indicate finger 2 (index finger) tapped, a "4" may indicate finger 3 (middle finger) tapped, etc.

As an example of data flow, consider the case where APP Y has been launched and the user wishes to select an item corresponding to an icon displayed at POS3 in the example GUI of FIG. 2. To select the item at POS3, the user wearing tap device 200 taps with their middle finger. Tap device 200 will process and interpret the resulting signals and send a "4" via BLE interface 210. The "4" will be received by BLE driver 240 in Host OS 220 and passed to TapOS framework 260. Specifically, the code "4" will be sent to Controller module 270. The controller module will interpret the code "4" to determine that the user selected item number 3, that is, the item at POS3 in the example of FIG. 2, which corresponds to the middle finger. Controller module 270 sends data indicating that the user selected item number 3 to Content module 280. The content module determines an item ID associated with item 3 and sends data to APP Y to inform the app that the item having the determined item ID was selected. Content Module 280 receives back from APP Y a list of the next items to display, that is, the options available for selection in APP Y when item 3 has been selected. (As one example, a social media type of application may include options to view a feed, view requests, create a new post, send a message, view notifications, or browse a virtual marketplace.) The list of next items may include, for example, an item ID for each item, the text to be displayed on an icon for the item, and an image (for example, in .png format) to be displayed as an icon for that item.

Those skilled in the art will understand that an API (Application Programming Interface) is available for most application software and operating systems, and such APIs can be utilized to enable TapOS framework 260 to interact with applications corresponding to icons (for example, to launch an app and/or to retrieve a list of available options as the list of next items for display). APIs can also be utilized to enable TapOS framework 260 to call upon services of Host OS 220 (for example, when navigating a hierarchical system of folders and files). On the other hand, an API for TapOS framework 260 can be made available to proprietors of operating systems and applications to enable support for TapOS framework 260 and control by a tap device to be built-in to the operating systems and/or applications. Also, a custom driver for the Tap Device 200 can be provided to facilitate communication between Host OS 220 and the tap device.

After receiving the list of next items, Content module 280 sends the list of next items to Controller module 270, which prepares updated view content for the GUI and sends that information to Presentation module 290. The presentation module renders a canvas for display and transmits that information (directly or indirectly) to Display driver 250. The display driver sends data to Display 230 to display the updated content, namely, five icons corresponding to five items from the list of next items. (There may be more than five items in the list of next items, but only five will be displayed at a time and items in excess of five will not be displayed until the user inputs further commands to rotate the icons.)

Thus, according to this example, the user selects the item in APP Y that is displayed at POS3 (item 3 in this example) by tapping the middle finger, and icons corresponding to options available in APP Y when item 3 is selected are then displayed in the GUI.

In example embodiments described above, items were rotated or shifted through different positions one slot at a time, e.g., one tap command to rotate clockwise would cause each item to rotate one slot in the clockwise direction. In one alternative example embodiment, tap commands can be used to initiate and terminate scrolling of the icons through various positions of the GUI. For example, a first tap command (for example, a command to rotate clockwise) initiates motion of the icons to rotate clockwise, and the icons will continue to rotate clockwise until the scrolling is stopped by a second tap command. The second tap command could be, for example, a predetermined tap combination to stop movement, another instance of the same tap command that initiated the scrolling, or a tap command for scrolling in the other direction (e.g., if the icons or rotating clockwise and a command to rotate counterclockwise is received, the scrolling will reverse direction). In one preferred embodiment, the icons pause at each position before scrolling to the next position, to afford the user time to terminate the scrolling and select a desired icon. The length of pause can be predetermined, but preferably it can be adjusted in settings to match an individual user's preference. Furthermore, the speed of the scrolling can be altered using tap commands. For example, the scrolling speed can be accelerated by multiple taps in the same direction (e.g., more taps cause faster scrolling). Also, the system can be configured so that scrolling will slow when additional taps cease (using the analogy of a virtual dial, the multiple taps constitute spinning the dial and, when no additional taps are made, the scrolling will decelerate through 'resistance' (the rate of deceleration can be preset or can be calculated based on features of the GUI, such as the number of items at the current display level).

According to yet another preferred embodiment, scrolling of icons can be initiated and terminated in accordance with a user's fingers touching a surface and lifting from the surface. Tap devices are known that can determine when fingertips contact a surface and also when the fingertips are lifted from the surface. (For example, a tap device that captures and analyzes images of a user's fingers can determine when the fingers contact a surface and when they move away from the surface.) Hence, according to this preferred embodiment, when fingers corresponding to a tap command to rotate icons clockwise tap against a surface, scrolling in the clockwise direction can begin and continue until the user lifts those fingers from the surface.

The scrolling feature described above allows faster scrolling of icons through different positions without requiring repetitive tap commands, and therefore it can reduce physical fatigue due to repeated tapping.

Those skilled in the art will recognize that different applications may require different types of input to interact with the application. While the TapOS system described herein provides a uniform interface for displaying and controlling a GUI to enable a user to interact with a host OS to select applications, file folders, menu options, etc.—and further enables use of the same uniform interface to interact with an application after it is launched—at some point interaction with the application may require input from the tap device that goes beyond browsing and selecting available options. For example, if the user wishes to create a new document using a word processing application, or compose an email or text using a messaging application, the user will need to input alphanumeric text. On the other hand, if the user wishes to play a game, the user will need to provide commands to control objects in the game, such as moving the object in various directions. To provide a seamless experience for the user after an application is launched, the tap device can be used to provide various types of input after an application is launched, other than control of a GUI. One approach to implement this functionality is for the TapOS system (for example, Controller module 270 in the data flow example of FIG. 14) to store a plurality of tables for mapping tap signals into commands and/or character data, and a different table is used to interpret received tap signals depending on the application that is active.

Alternatively, the tap device itself can be dynamically reconfigured to provide different types of input to a host system. U.S. Pat. No. 10,691,205, for example, discloses a tap device with dynamically switchable modes, and it is herein incorporated by reference in its entirety. The mode of a tap device as disclosed in that patent can be changed by manually setting switches on the tap device or by inputting appropriate tap commands with the tap device to change its operating mode. To provide an even more user-friendly experience, however, the tap device mode can be changed by the TapOS system (for example, by Controller module 270 in TapOS framework 260 in the example of FIG. 14). More specifically, the TapOS system can keep track of the active application and determine the appropriate mode for the tap device (for example, by using a stored table of data indicating the appropriate tap mode for different applications and/or when different options are selected within various applications). The TapOS system can then transmit to the tap device an instruction to change the mode and information about the mode value for the new mode, and the tap device can change its mode according to the received instruction. It should be noted that the mode set for the tap device disclosed in U.S. Pat. No. 10,691,205 does not merely change the type of data or commands output by the tap device, but it also is used to optimize operation of the tap device to provide the most accurate data or commands in a set mode. Thus, by utilizing a tap device with dynamic mode switching, a user can control a GUI using a tap device to browse and select options and then seamlessly transition to using the tap device for interacting with an application when it is necessary to input specific types of data or commands to the active application.

Those skilled in the art will appreciate that the TapOS system can be implemented as a replacement GUI for a variety of different operating systems. For example, in a Windows® operating system, the included graphical user interface is Windows Shell. A number of shell replacements for Windows Shell have been released, such as Blackbox, Cairo Shell, and ReactOS Explorer. Similarly, the TapOS system described herein can be used as a replacement for Windows Shell. In addition, like other programs running on Windows, the TapOS system can access the computer's resources by utilizing the Windows shell namespace. Among other things, the TapOS system can utilize the shell namespace to browse the hierarchy of shell objects (e.g., folders and files) akin to the use of File Explorer, but using tap-driven commands as discussed above to navigate between and within levels.

In a device using the Android operating system, for example, processor 110 can cause GUI 120 to be rendered in a graphics buffer, based on current stored data indicating the items to be displayed as icons and information concerning the characteristics of GUI 120, such as the position where the GUI should be displayed, the number, size, and shape of the icons, the orientation of the icons (for example, in a partial circle or a straight line), etc. The Android system service SurfaceFlinger composites the GUI images, and the hardware composer renders the graphic images for display on the display screen.

In a case where a GUI is integrated into the kernel in a proprietary operating system, the TapOS described herein can be incorporated into the kernel by the proprietor of the OS.

Although various specific operating systems have been mentioned above, the TapOS system described herein is not limited to use with only those operating systems. Those are merely examples, and one skilled in the art would understand that the TapOS system can be provided as a replacement or alternative GUI for other operating systems.

The above-described examples, and other variations that will be apparent to those skilled in the art, provide at least the following advantages over a conventional point-and-click type graphical user interface. First, GUI 120 can be displayed in a compact form so as not to occupy a large portion of the display screen and thereby avoiding hiding or obscuring other content. This is particularly advantageous in AR environments, where it is desirable to see both the actual image content and the computer-generated content while also having a GUI to allow the user to interact with the content.

Also, by having a one-to-one relationship between the fingers of a hand (or hands, in a two-handed embodiment) and the displayed icons, a user can activate an icon by tapping only one finger (or, alternatively, can select an icon by tapping one finger, and then activate the selected icon in a predetermined way).

In addition, the click-to-select approach implemented by the TapOS system enables a user to interact with the GUI and activate or select specific icons with accuracy, without the need to manipulate a cursor as in a point-and-click system. In particular, a user who is moving does not need to worry about positioning a cursor in a particular position, which may be difficult when moving. Moreover, the user does not need to use movements or gestures to move and position a cursor that would require raising the arm and/or hand in the air. Rather, the user's hand and arm can remain in a relaxed position so that they do not grow tired. The tap device can detect taps by fingers against any arbitrary surface. Therefore, a user who is standing or walking can keep their arm lowered and their hand by their side, and simply tap their fingers against their leg, for example. Furthermore, since the user does need not rely on their vision to move their hand (or a virtual cursor) to a specific position, visual fatigue can be reduced or eliminated. In addition, in a system that would normally require a pointing device such as a mouse, that hardware component can be eliminated since the user's hand (and, specifically, taps by the user's fingers) is used to control the GUI.

It should be understood that other embodiments may utilize other methods in each part of the invention. For example, various techniques are possible for interpreting signals from a tap device, rendering the GUI for display on a display screen, and/or implementing functions associated with an activated icon.

Software aspects of the example embodiments presented herein may be provided as a computer program product, or software, that may include an article of manufacture on a machine accessible or machine-readable medium having instructions. The instructions on the non-transitory machine accessible machine readable or computer-readable medium may be used to program a computer system or other electronic device. The machine or computer-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "computer-readable", "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Portions of the example embodiments of the invention may be conveniently implemented by using a conventional general purpose computer, a specialized digital computer, and application specific integrated circuit (ASIC), a microcontroller, a microprocessor programmed according to the teachings of the present disclosure, field programmable gate arrays, an appropriate network of conventional component circuits, and/or other combinations of hardware and/or software that perform the necessary functions, as is apparent to those skilled in the computer art. Appropriate software coding may readily be prepared by skilled programmers based on the teachings of the present disclosure.

Some embodiments include a computer program product. The computer program product may be a storage medium or media having instructions stored thereon or therein which can be used to control, or cause, a computer to perform any of the procedures of the example embodiments of the invention. The storage medium may include without limitation an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further includes software for performing example aspects of the invention, as described above.

Included in the programming and/or software of the general and/or special purpose computer or microprocessor are software modules for implementing the procedures described above.

While various example embodiments have been described above, it should be understood that they have been presented by way of example, and not limitation. It is apparent to persons skilled in the relevant art(s) that various changes in form and detail can be made therein. Thus, the invention should not be limited by any of the above-described example embodiments. Also, as used herein, the singular forms "a," "an," and "the," are intended to include the plural forms as well, unless the context clearly indicates otherwise.

In addition, it should be understood that the figures are presented for example purposes only. The architecture of the example embodiments presented herein is sufficiently flexible and configurable, such that it may be utilized and navigated in ways other than that shown in the accompanying figures.

We claim:

1. An information processing device comprising:
a display;
a communication interface configured to receive signals from a tap device, wherein the received signals correspond to signals generated by the tap device based on interaction of a user's fingers with an arbitrary physical surface, and the received signals represent only information about which of the user's fingers tapped on the arbitrary physical surface;
one or more processors; and
one or memories storing instructions that, upon execution by the one or more processors, cause the one or more processors to:
  display a plurality of icons on the display in a predetermined pattern as a graphical user interface, wherein the predetermined pattern has five selectable positions that have a one-to-one correspondence with the fingers of a user's hand and one icon is displayed at each selectable position;
  interpret the signals received from the tap device, based only on the information about which of the user's fingers tapped on the arbitrary physical surface, to determine which single finger among the user's five fingers individually tapped on the arbitrary physical surface;
  based on the determination of the single finger that tapped on the arbitrary physical surface, select the one of the five selectable positions that corresponds to the single finger determined to have tapped the arbitrary physical surface; and
  alter the appearance of the icon displayed at the selected position to indicate the selected position.

2. The information processing device according to claim 1,
wherein, in response to selecting one of the five selectable positions, a function corresponding to the icon displayed at the selected position is activated.

3. The information processing device according to claim 2, wherein said device further comprises a transmitter configured to transmit signals to the tap device, and wherein after a function corresponding to an icon is activated a signal is transmitted to the tap device to confirm activation.

4. The information processing device according to claim 2, wherein the displayed icons correspond to respective applications and activating the function corresponding to a selected icon causes the corresponding application to be launched.

5. The information processing device according to claim 4, wherein after an application is launched, a new set of icons is displayed corresponding to functions available in that application.

6. The information processing device according to claim 4, wherein the appearance of the icon displayed at the selected position is altered to display the icon with greater brightness than the icons displayed at other selectable positions.

7. The information processing device according to claim 1,
wherein, if the same single finger is consecutively tapped a second time after a corresponding position has been selected, a function corresponding to the icon displayed at the selected position is activated.

8. The information processing device according to claim 1, wherein the stored instructions further cause the one or more processors to:
detect when more than one finger taps the arbitrary physical surface at the same time,
if it is detected that a first predetermined combination of fingers taps the arbitrary physical surface at the same time, the plurality of icons are shifted to different selectable positions in a first direction, and
if it is detected that a second predetermined combination of fingers taps the arbitrary physical surface at the same time, the plurality of icons are shifted to different selectable positions in a second direction opposite to the first direction.

9. The information processing device according to claim 8,
wherein a number of displayable icons is greater than the number of selectable positions in the predetermined pattern, and
wherein the shifting of icons to different positions in the predetermined pattern causes at least one icon to cease being displayed and causes at least one previously undisplayed icon to be displayed at a selectable position.

10. The information processing device according to claim 8, wherein if the fingers of a user's right hand are designated so that the thumb is the first finger, the index finger is the second finger, the middle finger is the third finger, the ring finger is the fourth finger, and the pinky finger is the fifth finger, then the signals received from the tap device are interpreted to correspond to the following types of instructions:
toggle the display of the graphical user interface on and off when all fingers are tapped simultaneously,
shift the displayed icons to different positions in the predetermined pattern in the first direction when finger one and finger two are tapped simultaneously,
shift the displayed icons to different positions in the predetermined pattern in the second direction when finger four and finger five are tapped simultaneously,
select an icon displayed at a first position of the predetermined pattern and activate the corresponding function when finger one is tapped,
select an icon displayed at a second position of the predetermined pattern and activate the corresponding function when finger two is tapped,
select an icon displayed at a third position of the predetermined pattern and activate the corresponding function when finger three is tapped,
select an icon displayed at a fourth position of the predetermined pattern and activate the corresponding function when finger four is tapped, and
select an icon displayed at a fifth position of the predetermined pattern and activate the corresponding function when finger five is tapped.

11. The information processing device according to claim 1, wherein the stored instructions further cause the one or more processors to:
detect when a combination of more than one finger taps the arbitrary physical surface at the same time, and
when a predetermined combination of fingers taps the arbitrary physical surface at the same time, a function corresponding to the icon at the selected position is activated.

12. The information processing device according to claim 11, wherein,
in response to detecting a second predetermined combination of fingers that tap the arbitrary physical surface at the same time, the plurality of icons begin shifting to different positions in the predetermined pattern automatically, and in response to detecting a third predetermined combination of fingers that tap the arbitrary physical surface at the same time, the plurality of icons stop shifting to different positions in the predetermined pattern.

13. The information processing device according to claim 1,
wherein a number of displayable icons is greater than the number of selectable positions in the predetermined pattern, and
wherein one or more icons are displayed with an appearance different from icons at a selectable position in the predetermined pattern to indicate that the one or more icons are not selectable.

14. The information processing device according to claim 1,
wherein a number of displayable icons is greater than the number of selectable positions in the predetermined pattern, and
wherein icons displayed at the selectable positions are displayed with a size proportional to the number of displayable icons.

15. The information processing device according to claim 1,
wherein a number of displayable icons is greater than the number of selectable positions in the predetermined pattern,
wherein the predetermined pattern is a circular or semicircular pattern, and
wherein a radius of the predetermined pattern is proportional to the number of displayable icons.

16. An information processing device comprising:
a display;

a communication interface configured to receive signals from a tap device, wherein the received signals correspond to signals generated by the tap device based on interaction of a user's fingers with an arbitrary physical surface, and the received signals represent only information about which of the user's fingers tapped on the arbitrary physical surface;

one or more processors; and one or memories storing instructions that, upon execution by the one or more processors, cause the one or more processors to:

display a plurality of icons on the display in a predetermined pattern as a graphical user interface, wherein the predetermined pattern has five selectable positions having a one-to-one correspondence with the fingers of a user's hand and one icon is displayed at each selectable position;

interpret the signals received from the tap device, based only on the information about which of the user's fingers tapped on the arbitrary physical surface, to detect that a predetermined combination of fingers tapped the arbitrary physical surface at the same time, wherein if it is detected that a first predetermined combination of fingers taps the arbitrary physical surface at the same time, the plurality of icons are shifted to different selectable positions in a first direction, and if it is detected that a second predetermined combination of fingers taps the arbitrary physical surface at the same time, the plurality of icons are shifted to different selectable positions in a second direction opposite to the first direction, wherein the predetermined pattern contains a predetermined default position, wherein an icon shifted to the default position in response to shifting the icons is the selected icon, and wherein the function corresponding to the selected icon is activated in response to an activation instruction.

17. The information processing device according to claim 16, wherein the activation instruction is a third predetermined combination of fingers that tap the arbitrary physical surface at the same time.

18. A method for controlling a graphical user interface displayed by an information processing device based on signals from a tap device, the method comprising:

displaying a plurality of icons in a predetermined pattern as the graphical user interface, wherein the predetermined pattern has five selectable positions that have a one-to-one correspondence with the fingers of a user's hand and one icon is displayed at each selectable position;

receiving signals from the tap device, wherein the received signals correspond to signals generated by the tap device based on interaction of a user's fingers with an arbitrary physical surface, and the received signals represent only information about which of the user's fingers tapped on the arbitrary physical surface;

interpreting the signals received from the tap device, based only on the information about which of the user's fingers tapped on the arbitrary physical surface, to determine which single finger among the user's five fingers individually tapped on the arbitrary physical surface;

based on the determination of the single finger that individually tapped on the arbitrary physical surface, selecting the one of the five selectable positions that corresponds to the single finger determined to have tapped the arbitrary physical surface; and altering the appearance of the icon displayed at the selected position to indicate the selected position.

19. The method according to claim 18, wherein, in response to selecting one of the five selectable positions, a the function corresponding to the icon displayed at the selected position is activated.

20. The method according to claim 18, wherein, if the same single finger is consecutively tapped a second time after a corresponding position has been selected, a function corresponding to the icon displayed at the selected position is activated.

21. The method according to claim 18, further comprising:

detecting when more than one finger taps the arbitrary physical surface at the same time, wherein if it is detected that a first predetermined combination of fingers taps the arbitrary physical surface at the same time, the plurality of icons are shifted to different selectable positions in a first direction, and if it is detected that a second predetermined combination of fingers taps the arbitrary physical surface at the same time, the plurality of icons are shifted to different selectable positions in a second direction opposite to the first direction.

22. A non-transitory computer-readable storage medium storing instructions for causing an information processing device to perform a method of controlling a graphical user interface based on signals from a tap device, the method comprising:

displaying a plurality of icons in a predetermined pattern as the graphical user interface, wherein the predetermined pattern has five selectable positions that have a one-to-one correspondence with the fingers of a user's hand and one icon is displayed at each selectable position;

receiving signals from the tap device, wherein the received signals correspond to signals generated by the tap device based on interaction of a user's fingers with an arbitrary physical surface, and the received signals represent only information about which of the user's fingers tapped on the arbitrary physical surface;

interpreting the signals received from the tap device, based only on the information about which of the user's fingers tapped on the arbitrary physical surface, to determine which single finger among the user's five fingers individually tapped on the arbitrary physical surface;

based on the determination of the single finger that individually tapped on the arbitrary physical surface, selecting the one of the five selectable positions that corresponds to the single finger determined to have tapped the arbitrary physical surface; and altering the appearance of the icon displayed at the selected position to indicate the selected position.

23. A system comprising:

a tap device configured to generate signals corresponding to tapping of a user's fingers on an arbitrary physical surface; and an information processing device that includes a display;

a communication interface configured to receive signals from the tap device, wherein the received signals correspond to signals generated by the tap device based on tapping of the user's fingers on the arbitrary physical surface, and the received signals represent only information about which of the user's fingers tapped on the arbitrary physical surface;

one or more processors; and one or memories storing instructions that, upon execution by the one or more processors, cause the one or more processors to:

display a plurality of icons on the display in a predetermined pattern as a graphical user interface, wherein the predetermined pattern has five selectable positions that have a one-to-one correspondence with the fingers of a user's hand and one icon is displayed at each selectable position;

interpret the signals received from the tap device, based only on the information about which of the user's fingers tapped on the arbitrary physical surface, to determine which single finger among the user's five fingers individually tapped on the arbitrary physical surface;

based on the determination of the single finger that tapped on the arbitrary physical surface, select the one of the five selectable positions that corresponds to the single finger determined to have tapped the arbitrary physical surface; and alter the appearance of the icon displayed at the selected position to indicate the selected position.

* * * * *